United States Patent [19]

Simko et al.

[11] Patent Number: 5,161,497

[45] Date of Patent: Nov. 10, 1992

[54] VARIABLE VALVE TIMING OPERATED ENGINE

[75] Inventors: Aladar O. Simko, Dearborn Heights; Robert A. Stein, Northville, both of Mich.

[73] Assignee: Ford Motor Company, Dearborn, Mich.

[21] Appl. No.: 850,471

[22] Filed: Mar. 11, 1992

[51] Int. Cl.$^5$ ............................................... F01L 1/34
[52] U.S. Cl. ................................................. 123/90.15
[58] Field of Search ........................... 123/90.15, 90.16

[56] References Cited

U.S. PATENT DOCUMENTS

| | | | |
|---|---|---|---|
| 4,305,352 | 12/1981 | Oshima et al. | 123/90.15 |
| 4,327,676 | 5/1982 | McIntire et al. | 123/90.16 |
| 4,534,323 | 8/1985 | Kato et al. | 123/90.16 |
| 4,582,029 | 4/1986 | Masuda et al. | 123/90.16 |
| 4,685,429 | 8/1987 | Oyaizu | 123/90.15 |
| 4,700,684 | 10/1987 | Pischinger et al. | 123/90.16 |
| 4,703,734 | 11/1987 | Aoyama et al. | 123/90.15 |
| 4,722,315 | 2/1988 | Pickel | 123/90.15 |
| 5,020,487 | 6/1991 | Kruger | 123/90.15 |

OTHER PUBLICATIONS

SAE Paper No. 800794, Jun. 1980, Tuttle.

Primary Examiner—E. Rollins Cross
Assistant Examiner—Weilun Lo
Attorney, Agent, or Firm—Jerome R. Drouillard; Roger L. May

[57] ABSTRACT

A method of operating an automotive-type engine by independently phase shifting the intake and exhaust valves to provide at part loads late closing of the intake valve during the compression stroke to reduce pumping losses, with a delayed overlap between the opening of the intake valve and closing of the exhaust valve controlled to reduce HC and control $NO_x$ by providing a desired level internal EGR by the backflow of gases into the cylinder and intake port, and late opening of the exhaust valve during the expansion stroke to increase expansion work; also a low overlap at idle for improved stability, and optimizing valve timings at wide open throttle for increased torque and power output.

11 Claims, 1 Drawing Sheet

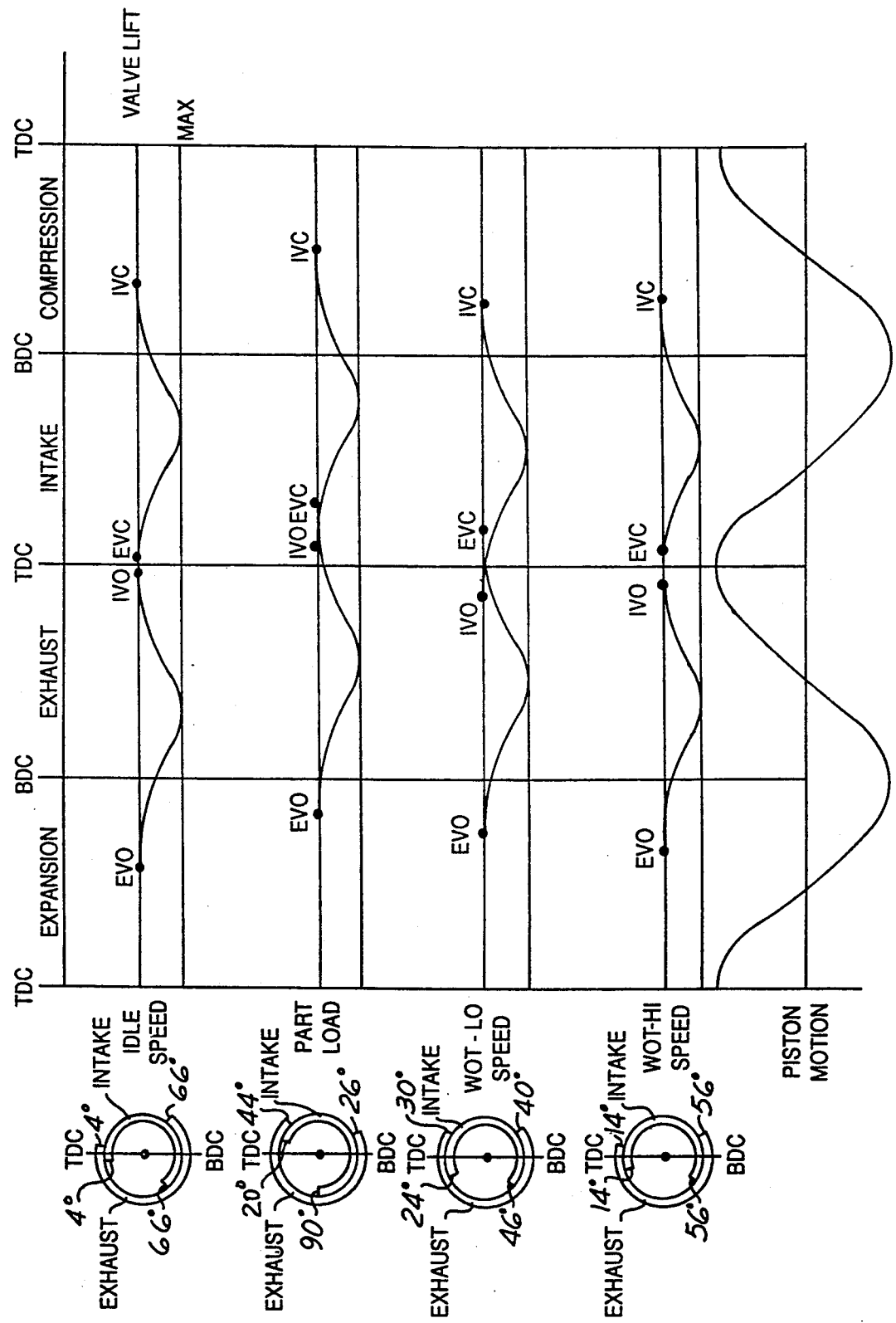

VARIABLE VALVE TIMING OPERATED ENGINE

FIELD OF THE INVENTION

This invention relates in general to an automotive-type engine timing system. More particularly, it relates to one in which the intake and exhaust valves are independently phase shifted to vary the timing to obtain better conditions of operation of the engine.

BACKGROUND OF THE INVENTION

Most commercially available automotive engines use fixed lift, duration and phasing of intake and exhaust valve events. As a result, there is a compromise between the best fuel economy, emission control and engine power conditions.

Potentially better fuel economy, emission control and other engine output benefits can be realized if the timing of these events can be varied depending on the engine operating mode.

This invention is directed to a method of phase shifting both the intake and exhaust camshafts/valves with a unique strategy to achieve the objectives described, and particularly at part load operation.

DESCRIPTION OF THE PRIOR ART

In general, variable valve timing by means of phase shifting is known in the prior art. For example, U.S. Pat. No. 4,305,352, Oshima et al., describes in Col. 4 and shows diagrammatically in FIGS. 6 and 7 a variable valve timing system in which late closing of the intake valve is utilized to improve engine efficiency. Oshima et al. calls for a large overlap between the opening of the intake valve and the closing of the exhaust valve for high speed operation, and a smaller overlap for engine idling speed operation.

Oshima et al. for part load operation state that the valve overlap should be increased by about 60° to decrease the amount of NOx in the exhaust gases. This large overlap is in direct contrast to the strategy proposed by this invention.

SAE Report No. 800794, Tuttle, dated June 1980, describes the advantages of variable valve timing by means of late intake valve closing However, no specific strategy is provided for operating an engine over the three main operating modes of idle, part load and wide open throttle.

U.S. Pat. No. 4,685,429, Oyaizu, shows a construction for varying the valve timing and is concerned primarily with controlling the valve overlap between intake valve opening and exhaust valve closing In this case, only the intake valve timing is adjusted Col. 4 describes and FIG. 5 shows the minimum and maximum overlaps, the exhaust valve always opening from bottom dead center and closing slightly after top dead center position. No particular strategy is provided for the three primary engine operating modes of idle, part load and wide open throttle. Furthermore, the closing of the exhaust valve only slightly after top dead center position does not provide the improved engine performance provided by the strategy of this invention to be described.

SUMMARY OF THE INVENTION

The strategy/method of this invention is to vary the valve timing schedules of both the intake and exhaust valves by suitable phase shifting of these events to obtain the most efficient operation during idle speed, part load and wide open throttle operating conditions. At part load, by utilizing late closing of the intake valve during the compression stroke and late closing of the exhaust valve during the intake stroke, a variable and delayed valve overlap is provided in accordance with operating conditions between the closing of the exhaust valve and opening of the intake valve to control the exhaust backflow to the cylinder and intake port for internal exhaust gas recirculation (EGR), as well as other benefits.

It is a primary object of the invention, therefore, to provide a method of operating an engine at part load by phase shifting the timing of opening and closing of the intake and exhaust valves to provide controlled internal EGR to control NOx and reduce HC levels, to reduce engine pumping losses, and to improve the expansion ratio.

Additional aspects of the invention are to provide stable operation at idle and increased torque and power output at wide open throttle.

Other objects, features and advantages of the invention will become more apparent upon reference to the succeeding, detailed description thereof, and to the single figure diagrammatically illustrating the strategy of the invention.

DESCRIPTION OF THE PREFERRED EMBODIMENT

The figure in general depicts diagrammatically the opening and closing events for both the intake and exhaust valves during the four strokes of the engine so as to better visually understand the strategy or method of the invention.

More specifically, as stated previously, the idea is to phase shift the opening and closing events to obtain better engine combustion, lower emissions and overall better operating efficiency.

At idle speed operation, it will be seen from the figure that the exhaust valve opens at approximately 66° before bottom dead center (BDC) position of the piston and closes at approximately 4° after top dead center (TDC) position in the intake stroke. The intake valve, on the other hand, opens at about 4° before TDC in the exhaust stroke and closes late in the compression stroke about 66° after BDC position. This provides a valve overlap of about 8° essentially symmetrically located with respect to TDC position. As a result, the small overlap will optimize combustion stability because the backflow of exhaust gases will minimize the amount of residual gas in the combustion chamber. It also, therefore, permits the engine to idle at a more efficient fuel economy than with a fixed timing schedule. The valve overlap, however, is not completely eliminated because some exhaust gas backflow into the intake port is used to enhance air/fuel mixing to promote combustion efficiency.

For part load operation, both the intake and exhaust events are shifted to the right from the idle speed positions shown to provide a later opening of the exhaust valve and a later closing of the intake valve, with a slightly larger overlap between the two than as before. More specifically, the exhaust valve opens at approximately 26° before BDC and closes approximately 44° after TDC in the intake stroke. The intake valve, on the other hand, now opens in the intake stroke at about 20° crank angle after TDC position and closes late in the compression stroke at about 90° crank angle.

The overlap in this case is increased to approximately 24° allowing the exhaust gas to be mixed with the fresh charge so as to reduce combustion temperatures for controlling the emission of NOx. The delaying of both the exhaust valve closing and the intake valve opening will permit the piston in its early phase of downstroke to draw exhaust gas from the exhaust port into the cylinder With this strategy, an external EGR system is not required as the delayed overlap between the intake valve opening and the exhaust valve closing provides the amount of backflow and EGR necessary. The exhaust gas backflow into the intake port also promotes air/fuel mixing as pointed out earlier. The exhaust gas expelled last from the cylinder is relatively high in unburned hydroCarbon (HC) concentrations, thus the recirculation of the exhaust gas reduces the HC feedgas level of the engine This delayed closing of the intake valve to approximately 90° in the compression stroke, under part load conditions, also results in the backflow of cylinder charge into the intake port in the first part of the compression stroke. This reduces the manifold vacuum and therefore pumping work at a given load, thus increasing fuel efficiency. The delay of the intake event also produces increased swirl that aids in the mixing process, therefore increasing the engine operating efficiency by maintaining adequately high burn rates that are otherwise reduced by the exhaust gas recirculation. The delayed opening of the exhaust valve at low speeds also improves the fuel efficiency due to increased expansion ratio.

The exact shifting of the events will vary as a function of the load. The quantity of air/fuel charge trapped in the cylinder during the compression stroke must be increased when increased torque output is required. This is achieved by closing the intake valve earlier at high loads. This also provides a larger valve overlap for internal EGR control of NOx under high torque operating conditions and under conditions when the manifold vacuum level is low.

Wide open throttle operation is accomplished in this concept by shifting the opening and closing events of the intake and exhaust valves back towards the idle speed positions, as compared to the part load events or positions, but with greater overlap than idle. More specifically, as shown in the figure, at low speed WOT operation, the exhaust valve will open at about 40° before BDC position in the expansion stroke to provide increased expansion work, and close about 30° after TDC position in the intake stroke. The intake valve, on the other hand, will open approximately 24° before TDC position in the exhaust stroke and close early in the compression stroke about 46° after BDC position to provide for trapping a larger volume of cylinder charge.

High speed wide open throttle operation is provided in this case by shifting the exhaust event slightly to the left while moving the intake event slightly to the right, thereby providing earlier exhaust opening and later intake closing, and a smaller valve overlap of about 28°. More specifically, the exhaust valve opens approximately 56° before BDC in the expansion stroke and closes approximately 14° after TDC in the intake stroke while the intake valve opens approximately 14° before TDC position in the exhaust stroke and closes later in the compression stroke approximately 56° after BDC position.

This delayed intake valve closing is desirable to take advantage of the inertia and wave dynamics of the incoming air column in the intake duct. The amount of overlap essentially prevents the exhaust gases from entering the intake port as the exhaust timing is carefully optimized to achieve adequately early blowdown without unduly restricting the final phase of the exhaust process.

From the above, it will be seen that the invention provides a method/strategy of operating an engine by phase shifting the opening and closing timing schedules of the intake and exhaust valves to optimize the operation of the engine for improved idle stability, fuel efficiency and WOT torque/power output. The need for an external EGR system is eliminated by providing a valve overlap with delayed timing in a controlled manner so that EGR is accurately metered under steady state as well as transient conditions.

While the invention has been shown and described in its preferred embodiment, it will be clear to those skilled in the arts to which it pertains, that many changes and modifications may be made thereto without departing from the scope of the invention.

We claim:

1. A method of operating an automotive-type internal combustion engine to control the emission of unburned hydrocarbons and nitrogen oxides while providing efficient engine operation, stable idle, and increased torque and power output, consisting of:

independently varying the openings and closings of the engine intake and exhaust valves from fixed valve lift and duration valve event timing schedules to provide the most efficient speed and torque operation accompanied by optimum fuel economy; and comprising the steps of:

for engine idle speed operation, providing a small overlap between the opening of the intake valve during the piston exhaust stroke and the closing of the exhaust valve during the piston intake stroke to minimize the amount of residual gas in the engine combustion chamber to increase fuel economy while concurrently providing a minimal backflow of gas into the intake manifold to promote mixing of the air/fuel charge for better combustion stability; and, for part load and moderate engine accelerating operating conditions, shifting the intake and exhaust valve timing events by significantly delaying the intake valve opening and the exhaust valve closing from their normal timing schedules and also to provide a greater overlap between the opening of the intake valve and the closing of the exhaust valve than at idle to provide a greater volume of internal exhaust gas recirculation (EGR) into the cylinder and intake port to reduce NOx and HC emissions, the crank angle degree and timing of overlap varying as a function of the load, the gas backflow into the cylinder and the intake port reducing engine pumping losses by reducing the manifold vacuum levels; and for engine wide open throttle (WOT) operating conditions, shifting the valve event timing schedules back towards the idle speed position but with a large valve overlap that decreases as a function of increasing the speed.

2. A method as in claim 1, wherein the valve overlap at idle is small and nearly symmetrical with respect to the piston top dead center position between the piston exhaust and intake strokes.

3. A method as in claim 1, wherein during engine part load operation, the intake valve closing is delayed during the compression stroke to provide backflow of cylinder charge into the intake port during the first part of the compression stroke to reduce the manifold vacuum level and pumping losses.

4. A method as in claim 1, wherein during engine part load operation, the valve overlap with delayed timing provides for the mixing of exhaust gas with the fresh charge to reduce combustion temperatures and the NOx emissions.

5. A method as in claim 1, wherein during engine part load operation, the valve overlap with delayed timing provides for the recirculation of exhaust gas that was expelled from the cylinder at the end of the exhaust stroke and is relatively high in unburned hydrocarbon emissions, thereby resulting in reduced overall hydrocarbon emissions.

6. A method as in claim 1, wherein during engine part load operation, the exhaust valve opening is delayed during the expansion stroke resulting in increased expansion work and providing greater fuel efficiency.

7. A method as in claim 1, wherein during engine idle speed operation, the small overlap advances the opening of the exhaust valve during the expansion stroke away from the piston bottom dead center position and thereby avoids over expansion.

8. A method as in claim 1, wherein during part load operating conditions, the controlling of an overlap duration in the delayed timing position prevents excessive pressure depression as the piston travels in the first half of the intake stroke.

9. A method as in claim 2, wherein the valve overlap at idle is in the range of approximately 8° crank angle.

10. A method as in claim 1, wherein during high speed WOT operation, the delayed intake valve closing utilizes the inertia and wave dynamics of the incoming charge in the intake duct to increase the trapped cylinder charge volume.

11. A method as in claim 1, wherein at low engine speed and full torque the intake valve is closed relatively early during the compression stroke to trap a larger volume of charge in the cylinder, and at higher speeds, the intake valve closing is delayed as a function of the increase in speed to trap a maximum amount of charge in the cylinder at all speeds.

* * * * *